(12) United States Patent
Hiller

(10) Patent No.: US 9,503,199 B2
(45) Date of Patent: Nov. 22, 2016

(54) MODULATED ECHO UNDERWATER COMMUNICATIONS AND ENERGY HARVESTING

(71) Applicant: The Boeing Company, Seal Beach, CA (US)

(72) Inventor: Nathan D. Hiller, Irvine, CA (US)

(73) Assignee: The Boeing Company, Chicago, IL (US)

( * ) Notice: Subject to any disclaimer, the term of this patent is extended or adjusted under 35 U.S.C. 154(b) by 424 days.

(21) Appl. No.: 14/084,645

(22) Filed: Nov. 20, 2013

(65) Prior Publication Data

US 2015/0138920 A1    May 21, 2015

(51) Int. Cl.
*H04B 11/00*    (2006.01)

(52) U.S. Cl.
CPC ..................... *H04B 11/00* (2013.01)

(58) Field of Classification Search
CPC ...... G01S 15/74; H04L 5/0046; H04B 11/00
See application file for complete search history.

(56) References Cited

U.S. PATENT DOCUMENTS

| | | | |
|---|---|---|---|
| 8,174,242 B2 | 5/2012 | Imai | |
| 8,346,415 B1 | 1/2013 | Hinnant, Jr. | |
| 2008/0289420 A1* | 11/2008 | Cochran | C23C 14/0617 73/596 |
| 2011/0178578 A1 | 7/2011 | Porat et al. | |
| 2014/0016558 A1* | 1/2014 | Lawry | H04L 5/0046 370/328 |
| 2015/0049587 A1* | 2/2015 | Lawry | H04L 5/14 367/87 |

FOREIGN PATENT DOCUMENTS

| | | |
|---|---|---|
| GB | 2399921 A | 9/2004 |
| WO | 2013148464 A1 | 10/2013 |

OTHER PUBLICATIONS

Abas, Effect of backing layer composition on ultrasonic probe bandwidth, NDT Group Industrial Technology Division, 2010 pp. 1-5.*
Akyildiz et al., "Challenges for Efficient Communication in Underwater Acoustic Sensor Networks," ACM Sigbed Review, 2004, 6 pages.
Akyildiz et al., "Underwater Acoustic Sensor Networks: Research Challenges," Ad Hoc Networks 3, 2005, pp. 257-279.
Audoly, "Review of Active Methods for Acoustic Echo Cancellation," SPIE vol. 1916, 1993, pp. 156-167.

(Continued)

*Primary Examiner* — Luke Ratcliffe
*Assistant Examiner* — Hovhannes Baghdasaryan
(74) *Attorney, Agent, or Firm* — Womble Carlyle Sandridge & Rice LLP

(57) ABSTRACT

A system is provided that includes a gateway node and terminal node. The gateway node may be configured to produce a continuous acoustic wave for propagation through a fluid such as water, and detect an echo thereof. The terminal node may be configured to control a piezoelectric layer to switchably reflect or transmit the acoustic wave incident thereon to produce and modulate the echo with a data stream to thereby convey the data stream within the echo, which the sensor of the gateway node may detect. The terminal node may be further configured to capture and store energy produced by the piezoelectric layer while the piezoelectric layer is controlled to transmit the incident acoustic wave. And at least a portion of the terminal node may be powerable from the stored energy.

18 Claims, 6 Drawing Sheets

(56) References Cited

OTHER PUBLICATIONS

Bereketli, "Remotely Powered Underwater Acoustic Sensor Networks," A Thesis Submitted to the Graduate School of Natural and Applied Sciences of Middle East Technical University, May 2013, 90 pages.
"Captain Nemo goes online," The Economist Technology Quarterly, Mar. 9, 2013, 2 pages.
Chitre et al., "Underwater Acoustic Communications and Networking: Recent Advances and Future Challenges," Marine Technology Society Journal, Spring 2008, vol. 42, No. 1, pp. 103-116.
Darner et al., "Ultrasonic Shutter," The Journal of the Acoustical Society of America, Sep. 1955, vol. 27, No. 5, pp. 908-912.
Freitag et al., "The WHOI Micro-Modem: An Acoustic Communications and Navigation System for Multiple Platforms," in IEEE Oceans Conference, Washington, DC, 2005, 7 pages.
Guyomar et al., "Wave Reflection Control Using Switched Piezoelements," Proceedings International Congress on Acoustics, 2004, Tu4.E.5, pp. II-1291-II-1294.
Harris et al., "When Underwater Acoustic Nodes Should Sleep With One Eye Open: Idle-time Power Management in Underwater Sensor Networks," 2006, WUWNet '06, Los Angeles, California, 4 pages.
Kintisch, "A Sea Change for U.S. Oceanography," Science, vol. 339, Mar. 8, 2013, pp. 1138-1143.
Lafleur et al., "Acoustically Active Surfaces Using Piezorubber," The Journal of the Acoustical Society of America 90 (3), Sep. 1991, pp. 1230-1237.
Nagy, "Introduction to Ultrasonics, 20-251-728," 2001, 40 pages.
Nagy, "Reflection and Transmission of Ultrasonic Waves," 2001, 27 pages.
Sozer, "Underwater Acoustic Networks," IEEE Journal of Oceanic Engineering, vol. 25, No. 1, Jan. 2000, pp. 72-83.
Stojanovic et al., "Underwater Acoustic Communication Channels: Propagation Models and Statistical Characterization," IEEE Communications Magazine, Jan. 2009, pp. 84-89.
Wills et al., "Low-Power Acoustic Modem for Dense Underwater Sensor Networks," 2006, WUWNet '06, Los Angeles, California, 7 pages.
Zhang et al., "Passive Underwater Acoustic Damping Using Shunted Piezoelectric Coatings," Institute of Physics Publishing, Smart Materials and Structures 10, 2001, pp. 414-420.
Great Britain Search and Examination Report dated May 18, 2015 for Application No. GB1420422.6.
A. Sanchez et al., "A low cost and high efficient acoustic modem for under sensor networks", 2011 IEEE, Spain, XP032040252.

* cited by examiner

MODULATED ECHO UNDERWATER COMMUNICATIONS AND ENERGY HARVESTING

TECHNOLOGICAL FIELD

The present disclosure relates generally to underwater communication and, in particular, to modulated echo underwater communication and energy harvesting.

BACKGROUND

Despite covering 70% of the earths' surface, little is known about the subsea environment. Its nearly-impermeable communication medium and great pressures make accessing subsea information a daunting challenge.

Subsea acoustic communication systems could soon be used to provide widespread information about the subsea environment. Thousands of small acoustic nodes shoveled out of a plane could carpet the ocean floors making the subsea environment abundant with accessible information.

The greatest challenge for vast subsea networks is the limited battery power of each acoustic node. Remotely powering these nodes is possible but power transfer is limited. The core problem is the high power required by these nodes during data transmission. For example, a typical node only consumes 80 to 100 mW in the listening state, but consumes 10 to 50 W during transmission.

Therefore, it would be desirable to have a system, apparatus and method that takes into account at least some of the issues discussed above, as well as possibly other issues.

BRIEF SUMMARY

Example implementations of the present disclosure are generally directed to a system, apparatus and method for modulated echo underwater communications, and perhaps also energy harvesting. According to one example, a system is provided that includes a gateway node and terminal node. The gateway node may include an actuator configured to produce a continuous acoustic wave for propagation through a fluid such as water, and a sensor configured to detect an echo thereof. The terminal node may be configured to control a piezoelectric layer to switchably reflect or transmit the acoustic wave incident thereon to produce and modulate the echo with a data stream to thereby convey the data stream within the echo. The sensor of the gateway node, then, may be configured to detect the echo modulated by the terminal node.

In some examples, the terminal node may be further configured to capture and store energy produced by the piezoelectric layer while the piezoelectric layer is controlled to transmit the incident acoustic wave. In these examples, at least a portion of the terminal node may be powerable from the stored energy.

In some examples, the terminal node may further include an acoustic absorber layer configured to receive a transmitted acoustic wave corresponding to the incident acoustic wave produced by transmission of the incident acoustic wave through the piezoelectric layer. In some further examples, the terminal node may further include an intermediate layer (e.g., a fluid layer or high-acoustical-impedance layer) between the piezoelectric layer and acoustic absorber layer. In these further examples, the terminal node may define a first primary reflective interface between the fluid and piezoelectric layer, and a second primary reflective interface between the piezoelectric layer and intermediate layer.

In some examples, the piezoelectric layer may be a first piezoelectric layer, and the terminal node may further include a second piezoelectric layer. In these examples, the second piezoelectric layer may be configured to receive a transmitted acoustic wave corresponding to the incident acoustic wave produced by transmission of the incident acoustic wave through the first piezoelectric layer. And in some further examples, the terminal may be configured to capture and store energy produced by the second piezoelectric layer, from which at least a portion of the terminal node may be powerable.

In some examples, the terminal node may further include a sensor configured to measure a physical property of an environment of the apparatus, and provide sensed input characteristic thereof. In these examples, the data stream with which the echo is modulated may be configured to carry the sensed input.

In other aspects of examples, an apparatus and method are provided for underwater communications, and perhaps also energy harvesting. The features, functions and advantages discussed herein may be achieved independently in various example implementations or may be combined in yet other example implementations further details of which may be seen with reference to the following description and drawings.

BRIEF DESCRIPTION OF THE DRAWING(S)

Having thus described example implementations of the disclosure in general terms, reference will now be made to the accompanying drawings, which are not necessarily drawn to scale, and wherein:

DETAILED DESCRIPTION

Figure 1:
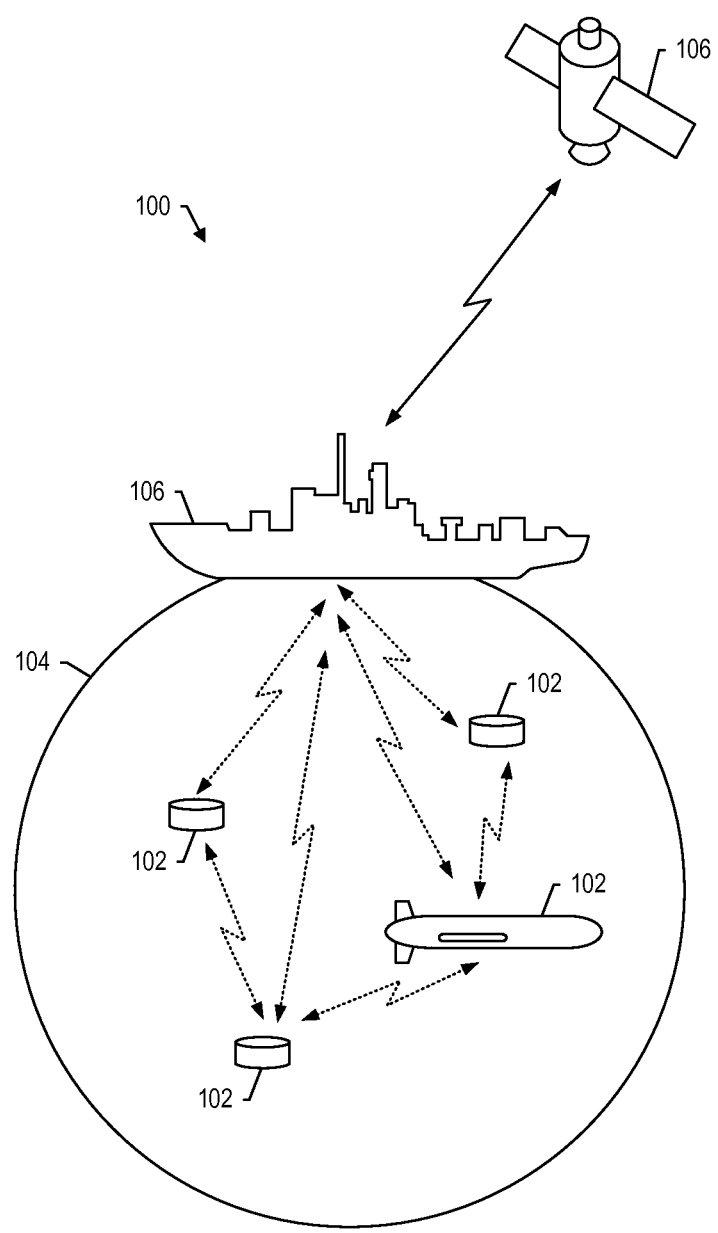
FIGS. 1 and 2 illustrate systems according to example implementations of the present disclosure.

Some implementations of the present disclosure will now be described more fully hereinafter with reference to the accompanying drawings, in which some, but not all variations of the disclosure are shown. Indeed, variations of the disclosure may be embodied in many different forms and should not be construed as limited to the examples set forth herein; rather, these are provided so that this disclosure will be thorough and complete, and will fully convey the scope of the disclosure to those skilled in the art. Examples may be described with reference to underwater communications and energy harvesting, such as in the context of ocean, river or stream current. It should be understood, however, that examples may be equally applicable to the communication and energy harvesting in other fluids. Further, for example, reference may be made herein to values of or relationships between components, parameters, properties, variables or the like. These and other similar values or relationships may be absolute or approximate to account for variations that may occur, such as those due to engineering tolerances or the like. Like reference numerals refer to like elements throughout.

FIG. 1 illustrates a system 100 according to one example of the present disclosure. The system may include one or more terminal nodes 102 such as sensors, unmanned underwater vehicles (UUVs) or the like, which may be deployed underneath the surface of a body of water 104 such as an ocean, river or stream. The terminal nodes may form an underwater local area network (UW-LAN), which may be connected to other networks including wired or wireless networks, other UW-LANs and the like, via one or more gateway nodes 106. These gateway nodes may include, for example, any of a number of different types of watercraft, buoys or the like, which may be deployed on or only partially beneath the surface of the body of water, or may be capable of moving between surface and beneath the surface of the body of water. Examples of suitable watercraft include boats, ships, hovercraft, underwater vehicles (e.g., submarines) and the like. Furthermore there may be more than one gateway node such as a chain of UUVs that relay data to the surface of the body of water.

Other examples of suitable gateway nodes 106 include those deployed over the surface of the body of water 104, or over or on ground. Examples of such a gateway node are aircraft, satellites or the like of suitable communication systems, which may be coupled to or otherwise part of one or more networks, such as the Internet, public switched telephone networks (PSTN), packet data networks (PDN), public land mobile networks (PLMN), private networks such as corporate and government networks, and/or other servers and services.

Figure 2:
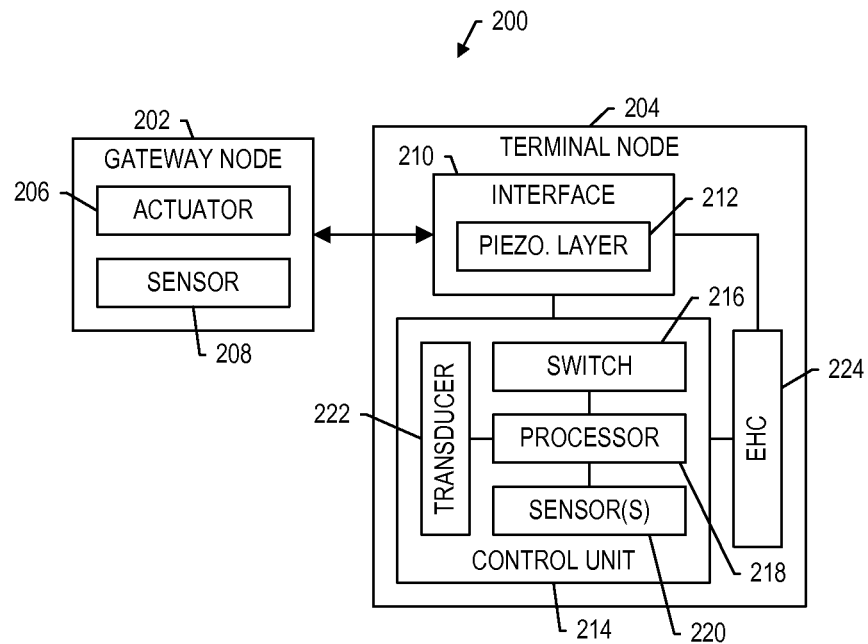

FIG. 2 more particularly illustrates a system 200 including a gateway node 202 and terminal node 204, which in some examples may correspond to a gateway node 106 and terminal node 102 of the system 100 of FIG. 1. As shown, the gateway node may include an actuator 206 configured to produce a continuous acoustic wave for propagation through a fluid such as water, and a sensor 208 configured to detect an echo thereof. In some examples, separate transducers may provide the functions of the actuator and sensor, or in other examples, a combination transducer may provide the functions of both the actuator and sensor.

In accordance with example implementations, a continuous acoustic wave may refer to an acoustic wave of constant or near-constant amplitude. In some examples, a continuous acoustic wave may also refer to such an acoustic wave in which the gateway node 202 may at one or more instances (e.g., continuously, periodically) change the acoustic wave frequency such as to account for the Doppler Effect that may result from a velocity difference between the gateway node and terminal node 204.

The terminal node 204 may include an interface structure 210 with a piezoelectric layer 212, which in some examples may be formed of a piezoelectric rubber. The terminal node may be configured to control the piezoelectric layer to switchably reflect or transmit the acoustic wave incident thereon to produce and modulate the echo with a data stream to thereby convey the data stream within the echo. The sensor 208 of the gateway node, then, may be configured to detect the echo modulated by the terminal node.

In some examples, the data stream may be a bit stream including a series of bits. In these examples, greater reflection (or weaker transmission) of the acoustic wave may produce a positive echo that represents a binary "1" of the bit stream, and greater transmission (or weaker reflection) of the acoustic wave may produce a lower if not null echo that represents a binary "0" of the bit stream. In other examples, greater reflection (or weaker transmission) of the acoustic wave may produce the positive echo that represents a binary "0," and greater transmission (or weaker reflection) of the acoustic wave may produce a lower if not null echo that represents a binary "1."

The piezoelectric layer 212 may be controllable to switchably reflect or transmit the continuous, incident acoustic wave propagating through the water. In some examples, the terminal node may include a control unit 214 configured to control the piezoelectric layer to switchably reflect or transmit the incident acoustic wave to produce and modulate the echo thereof with the data stream. The control unit may in turn include a switch 216 and a processor 218. The switch may be electrically connected to opposing surfaces of the piezoelectric layer, and controllable to switchably, electrically disconnect or connect the surfaces. And the processor may be configured to control the switch to thereby control the piezoelectric layer to switchably reflect or transmit the incident acoustic wave.

In some examples, the switch 216 may be a single-pole, single-throw (SPST) switch, a single-pole, double-throw (SPDT) switch or the like, and may be electrical or electromechanical. The processor 218 is generally any piece of computer hardware that is capable of processing information, and in some examples, the processor may include or otherwise be configured to communicate with suitable memory. In some examples, the processor may be capable of processing information such as, for example, data, computer-readable program code, instructions and the like (generally "computer programs," e.g., software, firmware, etc.), and/or other suitable electronic information. More particularly, for example, the processor may be configured to execute computer programs, which may be stored onboard the processor or otherwise stored in the memory (of the same or another apparatus).

The processor 218 may be a number of processors, a multi-processor core or some other type of processor, depending on the particular implementation. Further, the processor may be implemented using a number of heterogeneous processor systems in which a main processor is present with one or more secondary processors on a single chip. As another illustrative example, the processor may be a symmetric multi-processor system containing multiple processors of the same type. In yet another example, the processor may be embodied as or otherwise include one or more application-specific integrated circuits (ASICs), field-programmable gate arrays (FPGAs) and the like. Thus, although the processor may be capable of executing a computer program to perform one or more functions, the processor of various examples may be capable of performing one or more functions without the aid of a computer program.

In some examples, the control unit 214 of the terminal node 204 may further include a sensor 220 configured to measure a physical property of an environment of the terminal node, and provide sensed input characteristic thereof. In these examples, the data stream with which the echo is modulated may be configured to carry the sensed input. Examples of suitable sensors include sensors capable of measuring one or more parameters of the water, such as salinity, conductivity, turbidity, acidity, oxygen, temperature, pressure, depth or the like. Other examples of suitable sensors include acoustic sensors, electromagnetic sensors, electric sensors, magnetic sensors, neutrino detectors and the like, as well as sensors capable of measuring sediment, pollution and the like.

In some examples, the control unit 214 may further include a transducer 222 or separate actuator and sensor configured to produce an acoustic wave for propagation through the water, and detect a similar acoustic wave. In this manner, the terminal node 204 may be configured to communicate with other terminal nodes. For example, the terminal node may produce an acoustic wave modulated with a data stream for broadcast to other terminal nodes, which may detect the acoustic wave and thereby the data stream conveyed by the modulated acoustic wave. In one example, this transducer may extend around an outer perimeter of the terminal node 204, such as in the form of an annulus around an outer perimeter of a cylindrical-shaped terminal node, which may facilitate outward projection of the acoustic wave toward other terminal nodes.

In some examples, the terminal node 204 may include an energy harvesting circuit (EHC) 224 configured to capture and store at least a portion of the wave energy propagating through the piezoelectric layer 212 while the piezoelectric layer is controlled to transmit the incident acoustic wave. In these examples, at least a portion of the terminal node may be powerable from the stored energy, such as at least a portion of the control unit 214. The EHC may generally include an energy accumulator such as a rechargeable battery or supercapacitor, and may include circuitry configured to perform an AC-to-DC conversion and/or voltage transformation, and which in some examples may be optimized given properties of the piezoelectric layer such as its electrical impedance, capacitance, frequency of vibration and the like.

Figure 3:
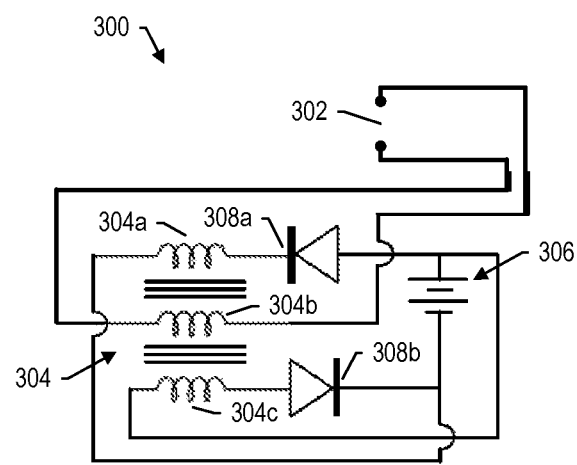
FIG. 3 illustrates an energy harvesting circuit (EHC) according to example implementations of the present disclosure.

FIG. 3 illustrates an EHC 300, which in some examples may correspond to the EHC 224 of FIG. 2. Generally, the EHC may include a number of circuit components electrically connected to one another. As shown, for example, the EHC may include terminals 302 connected to respective surfaces of a piezoelectric layer 212. The EHC may also include a multi-coil inductive element 304 electrically connected to an energy accumulator 306 via top and bottom diodes 308a, 308b. More particularly, for example, the inductive element may include a top coil 304a, center coil 304b and bottom coil 304c. The top and bottom coils may be connected to the energy accumulator via respective ones of the top and bottom diodes. The center coil may be connected to the terminals, which again are connected to respective surfaces of the piezoelectric layer.

According to example implementations of the present disclosure, the piezoelectric layer 212 may vibrate and thereby produce an alternating (AC) voltage while it is controlled to transmit the incident acoustic wave, which may drive current through the center coil 304b of the inductive element 304. The center coil may in turn create a magnetic field that the top and bottom coils 304a, 304c try and oppose with a counter magnetic field. In instances in which the current through the center coil travels in one direction (e.g., to the left), the top coil may produce this counter magnetic field, while the bottom diode 308b may block current flow in the respective direction to the bottom coil. The top coil may thereby produce a current that may be driven to the energy accumulator 306, and the voltage of this current may be at least partially based on the ratio of the number of coils in the top coil to those in the center coil.

Conversely, in instances in which the current through the center coil travels in the opposite direction (e.g., to the right), the bottom coil 304c may produce the counter magnetic field, while the top diode 308a may block current flow in the respective direction to the top coil 304a. Here, the bottom coil may produce a current that may be driven to the energy accumulator 306. The voltage of this current may be at least partially based on the ratio of the number of coils in the bottom coil to those in the center coil. Notably, the current from both the top coil and bottom coil may be driven to the energy accumulator such that polarity of the voltage on the battery does not change, thereby producing a DC voltage.

Briefly returning to FIG. 2, the interface structure 210 with its piezoelectric layer 212 may be configured and connected to the control unit 214 and EHC 224 in any of a number of manners. In some examples, the interface structure or at least its piezoelectric layer may have a corner reflector (or retroreflector) form factor to facilitate reflection of an incident acoustic wave in the same direction in which the wave originated. And in some examples, the interface structure may be a multilayered structure including the piezoelectric layer and one or more other layers. Examples of suitable arrangements of the interface structure and its connections to a suitable control unit and EHC are shown in FIGS. 4, 5 and 6.

Before describing the example arrangements, a brief explanation of the basic principle of operation of the piezoelectric layer 212 to reflect or transmit an incident acoustic wave may be beneficial. An acoustic wave propagating through a fluid such as water may reach an interface (a primary reflective interface) of the water and surface of the piezoelectric layer on which the acoustic wave may be incident. The water and piezoelectric layer may have different acoustic impedances, and this acoustic impedance mismatch may cause at least some amount (amplitude) of the acoustic wave to reflect. The amount of reflection may be given by a reflection coefficient, which may be represented as follows:

$$R = \frac{(\rho_p c_p - \rho_w c_w)}{(\rho_p c_p + \rho_w c_w)} \tag{1}$$

In the preceding, $\rho_w$, $c_w$ represent the density and speed of sound for water (its acoustic impedance $Z_w = \rho_w c_w$), and $\rho_p$, $c_p$ represent the density and speed of sound for the piezoelectric layer (its acoustic impedance $Z_p = \rho_p c_p$).

From the above reflection coefficient, it may be seen for example that the reflection coefficient and thus the amount of reflection (and transmission) may depend on the speed of sound in the piezoelectric layer 212 ($c_p$). The speed of sound in the piezoelectric layer may in turn depend on its stiffness, which may be varied by varying the voltage between the two surfaces of the piezoelectric layer. For example, given a piezoelectric material with an acoustic impedance much greater than that of water, an open-circuit condition between the surfaces may generally result in a higher stiffness of the piezoelectric layer and increased speed of sound, which may lead to a greater amount of reflection. On the other hand, short-circuit condition (i.e., V≈0) between the surfaces may generally result in a lower stiffness of the piezoelectric layer and reduced speed of sound, which may lead to a greater amount of transmission.

In some examples, the interface structure 210 may define multiple primary reflective interfaces. These interfaces may include the aforementioned interface of the water and surface piezoelectric layer 212 on which the acoustic wave is incident, but may also include an interface of an opposing surface of the piezoelectric layer and a material such as water or some other material (e.g., steel) having a different acoustic impedance than that of the piezoelectric layer. In these examples, some amount of the incident acoustic wave may reflect from each of the primary reflective interfaces, which may lead to the reflections constructively or destructively interfering with one another. Here, the reflection coefficient (or transmission coefficient) of the piezoelectric layer may be periodic and further depend on the ratio of the piezoelectric layer thickness to its acoustic wavelength ($d_p/\lambda_p$). Or in other terms, the reflection coefficient may further depend on the thickness of the piezoelectric layer, which may be given in terms of its acoustic wavelength. The acoustic wavelength may be the phase speed of sound in the piezoelectric material divided by the wave frequency.

In the simple case of the interface structure 210 defining multiple primary reflective interfaces where the material both in front of and behind the piezoelectric layer 212 is water, for example, the reflection coefficient may be represented as follows:

$$|R| = \frac{\xi \sin(2\pi d_p/\lambda_p)}{\sqrt{\xi^2 \sin^2(2\pi d_p/\lambda_p) + 1}} \quad (2)$$

where $\xi=0.5|Z_p/Z_w-Z_w/Z_p|$. In this case, transmission through the piezoelectric layer may be at a maximum when $d_p/\lambda_p=0.5$ ($d_p=0.5\lambda_p$), or an odd multiple thereof (e.g., $d_p/\lambda_p=1.5, 2.5, 3.5, \ldots$). Likewise, reflection from the piezoelectric layer may be at a maximum when $d_p/\lambda_p=0.25$ ($d_p=0.25\lambda_p$), or an odd multiple thereof (e.g., $d_p/\lambda_p=0.75, 1.25, 1.75, \ldots$).

In a more complex case, the interface structure 210 may define multiple primary reflective interfaces where the material behind the piezoelectric layer 212 includes a material other than water. In a more particular instance of this case, the acoustic impedance of the piezoelectric layer ($Z_p$) may be related to that of the water ($Z_w$) and material behind the piezoelectric layer ($Z_{load}$) as follows:

$$Z_p=\sqrt{Z_w Z_{load}} \quad (3)$$

In this particular instance, transmission through the piezoelectric layer may be at a maximum when $d_p/\lambda_p=0.25$ ($d_p=0.25\lambda_p$), or an odd multiple thereof (e.g., $d_p/\lambda_p=0.75, 1.25, 1.75, \ldots$). And reflection from the piezoelectric layer may be at a maximum when $d_p/\lambda_p=0.5$ ($d_p=0.5\lambda_p$), or an odd multiple thereof (e.g., $d_p/\lambda_p=1.5, 2.5, 3.5, \ldots$).

Figure 4A:
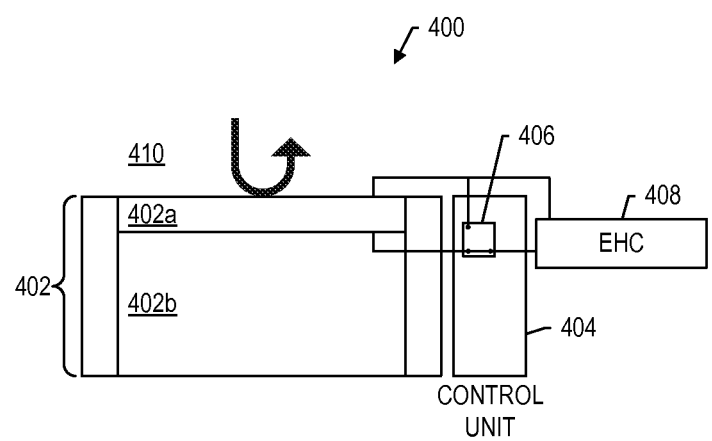
FIGS. 4A, 4B, 5A, 5B and 6A, 6B illustrate suitable arrangements of an interface structure and its connections to a suitable control unit and EHC, according to example implementations of the present disclosure.
Figure 4B:
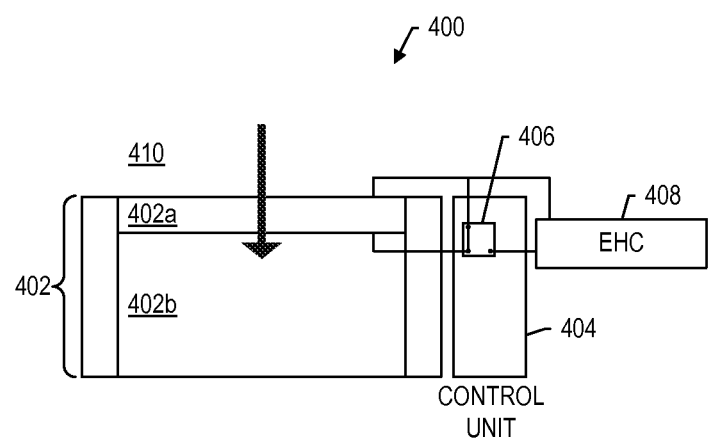

Now referring to the example arrangements, FIGS. 4A and 4B (collectively FIG. 4) illustrate an arrangement 400 including an interface structure 402, control unit 404 including a switch 406 and perhaps also other components (e.g., processor, sensor(s), transducer), and an EHC 408. In some examples these components may correspond to respective ones of the interface structure 210, control unit 214, switch 216 and EHC 224 of FIG. 2. In this example, the interface structure may include a piezoelectric layer 402a (e.g., piezoelectric layer 212), and may further include an acoustic absorber layer 402b.

As shown, the switch 406 may be a SPDT switch electrically connected to opposing surfaces of the piezoelectric layer 402a, and to the EHC 408. The switch may be controllable between a first position (FIG. 4A) and a second position (FIG. 4B) to switchably, electrically disconnect or connect the surfaces of the piezoelectric layer. In the first position, the switch may electrically disconnect the surfaces of the piezoelectric layer to the EHC. In some examples, the EHC may have a high electrical impedance such that in the first position, the surfaces of the piezoelectric layer may effectively be in an open-circuit condition. In the second position, the switch may electrically connect the surfaces of the piezoelectric layer together such as in a short-circuit condition.

The arrangement 400 of FIG. 4 may define one primary reflective interface between water 410 in which an incident acoustic wave propagates, and one of the surfaces of the piezoelectric layer 402a. The arrangement may also have an interface between the other of the surfaces of the piezoelectric layer and the acoustic absorber layer 402b, but this interface may be primarily absorptive and have little if any effect on reflectivity of the first interface (particularly in instances in which the piezoelectric layer has a thickness $>>0.5\lambda_p$). In some examples, in fact, the interface structure 402 may not include an acoustic absorber layer, and the terminal node 102, 204 may instead rely on materials in its environment such as sand or some other material on the floor of the body of water in which the terminal node is deployed. In this case, the acoustic wave frequency may be selected such that it may be easily absorbed by the floor of the body of water.

As explained above, an acoustic wave propagating through the water 410 experiences an acoustic impedance mismatch at an interface of the water and piezoelectric layer 402a, which in turn causes at least some of the incident acoustic wave to reflect off the piezoelectric layer. In this arrangement, an open-circuit condition between the surfaces of the piezoelectric layer may cause a greater amount of the incident acoustic wave to reflect than in the short-circuit condition. Thus, in the first position (FIG. 4A) of the switch 406, the effective open-circuit condition between the surfaces of the piezoelectric layer may cause a greater amount of the incident acoustic wave to reflect.

In the second position (FIG. 4B) of the switch 406, the short-circuit condition between the surfaces of the piezoelectric layer 402a may cause a greater amount of the incident acoustic wave to transmit through the piezoelectric layer. In this condition, the acoustic absorber layer 402b may receive a transmitted acoustic wave corresponding to the incident acoustic wave produced by transmission of the incident acoustic wave through the piezoelectric layer. And here, the EHC 408 may capture and store energy produced by the piezoelectric layer, from which again, at least a portion of the terminal node 102, 204 may be powerable.

Figure 5A:
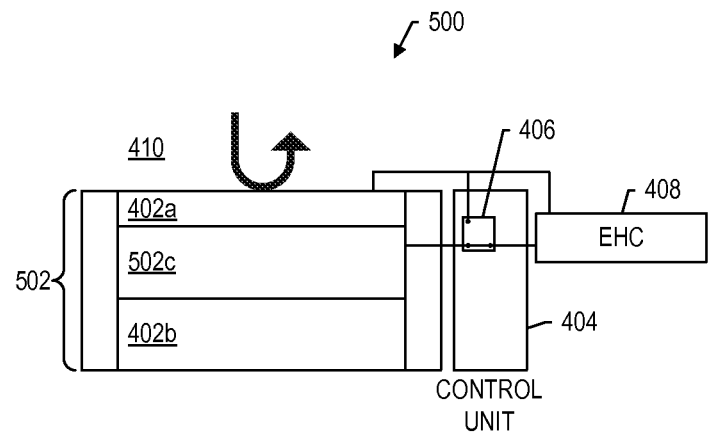
Figure 5B:
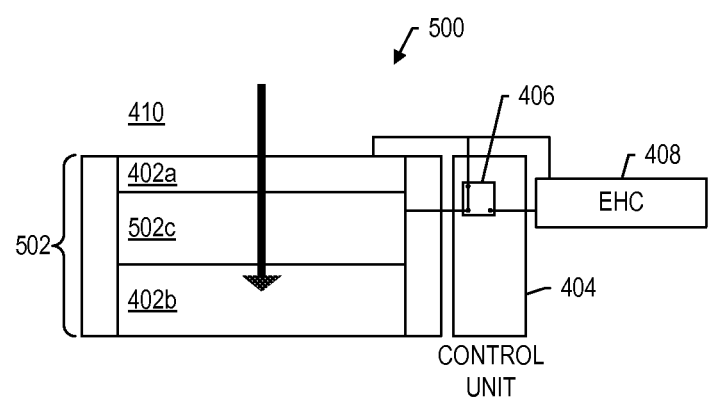

FIGS. 5A and 5B (collectively FIG. 5) illustrate an arrangement 500 including an interface structure 502, control unit 404, switch 406 and EHC 408, which in some examples may correspond to respective ones of the interface structure 210, control unit 214, switch 216 and EHC 224 of FIG. 2. As shown, this arrangement 500 may be similar to the arrangement 400 of FIG. 4, but in which the interface structure 502 includes one or more intermediate layers 502c between the piezoelectric layer 402a and acoustic absorber layer 402b. In some examples, the intermediate layer(s) may include a fluid layer of water 410 (or other fluid in which the incident acoustic wave propagates to the terminal node 102, 204). Additionally or alternatively, for example, the intermediate layer(s) may include an (acoustic)-impedance layer such that $Z_p=\sqrt{Z_w Z_{load}}$ ($Z_{load}$, again, referring to the acoustic impedance of the layer behind the piezoelectric layer).

The arrangement 500 of FIG. 5 may define two or more primary reflective interfaces. These interfaces may include one between the water 410 in which an incident acoustic wave propagates, and one of the surfaces of the piezoelectric layer 402a, and another between the piezoelectric layer and the intermediate layer 502c. Again, the interface between the intermediate layer and acoustic absorber layer 402b may be primarily absorptive, although as explained above, the interface structure 502 need not include an acoustic absorber layer).

In some examples, the arrangement 500 of FIG. 5 may behave similar to the arrangement 400 of FIG. 4. That is, in a first position (FIG. 5A) of the switch 406, the surfaces of the piezoelectric layer 402a may be in an effective open-circuit condition, which may cause a greater amount of the incident acoustic wave to reflect. And in a second position (FIG. 5B) of the switch, the short-circuit condition between the surfaces of the piezoelectric layer may cause a greater amount of the incident acoustic wave to transmit through the piezoelectric layer. Similar to before, in this position, the EHC 408 may capture and store energy produced by the piezoelectric layer, from which again, at least a portion of the terminal node 102, 204 may be powerable.

In the case of multiple primary reflective interfaces in the arrangement 500 of FIG. 5, since some amount of the incident acoustic wave may reflect from each of the primary reflective interfaces, the reflections may constructively or destructively interfere with one another. The amount of the incident acoustic wave reflected or reciprocally transmitted by the piezoelectric layer 402a may therefore depend on the ratio of the piezoelectric layer thickness to its acoustic wavelength ($d_p/\lambda_p$). Or in other terms, the reflection coefficient may further depend on the thickness of the piezoelectric layer, which may be given in terms of its acoustic wavelength.

In some examples the intermediate layer 502c may be a fluid layer of water 410. In these examples, the thickness of the piezoelectric layer 402a may be selected such that in the short-circuit condition (greater transmission), $d_p/\lambda_p \approx 0.5$ ($d_p \approx 0.5\lambda_p$), or an odd multiple thereof (e.g., $d_p/\lambda_p = 1.5, 2.5, 3.5, \ldots$). This may further increase transmission through the piezoelectric layer. In the open-circuit condition (greater reflection), the speed of sound in the piezoelectric material may change, which may result in a change in the acoustic wavelength such that $d_p/\lambda_p \approx 0.5 \pm \Delta$ ($d_p \approx 0.5\lambda_p \pm \Delta$). Here, the amount of reflection may increase as $\Delta \to 0.25$, and may provide at least some amount of added reflection (depending on how close $\Delta$ gets to 0.25).

In some examples the intermediate layer 502c may be a high-acoustical-impedance layer of a material such as steel, and the piezoelectric layer and high-acoustical-impedance layer may be selected so as to have the acoustic impedance relationship as per the above equation (3). In these examples, the thickness of the piezoelectric layer 402a may be selected such that in the short-circuit condition (greater transmission), $d_p/\lambda_p \approx 0.25$ ($d_p \approx 0.25\lambda_p$), or an odd multiple thereof (e.g., $d_p/\lambda_p = 0.75, 1.25, 1.75, \ldots$). This may further increase transmission through the piezoelectric layer. In the open-circuit condition (greater reflection), the speed of sound in the piezoelectric material may change, which may result in a change in the acoustic wavelength such that $d_p/\lambda_p \approx 0.25 \pm \Delta$ ($d_p \approx 0.25\lambda_p \pm \Delta$). Here, similar to before, the amount of reflection may increase as $\Delta \to 0.25$, and may provide at least some amount of added reflection (depending on how close $\Delta$ gets to 0.25).

Relative to the arrangement 400 of FIG. 4, the arrangement 500 of FIG. 5 may have increased complexity, but may also provide a greater contrast between the amount of an incident acoustic wave reflected by the piezoelectric layer 402a, and the amount of the incident acoustic wave transmitted by the piezoelectric layer. This may facilitate its modulation and proper detection by the gateway node 106, 202. The arrangement 500 including the high-acoustical-impedance layer may soften the destructive interference for small variations from being completely in-phase, and may therefore be more robust than the arrangement 400 including the fluid layer. And the arrangement 500 including the high-acoustical-impedance layer may in some instances be easier to construct in a desired form factor (e.g., corner reflector), and may be more robust to different environmental conditions.

Figure 6A:
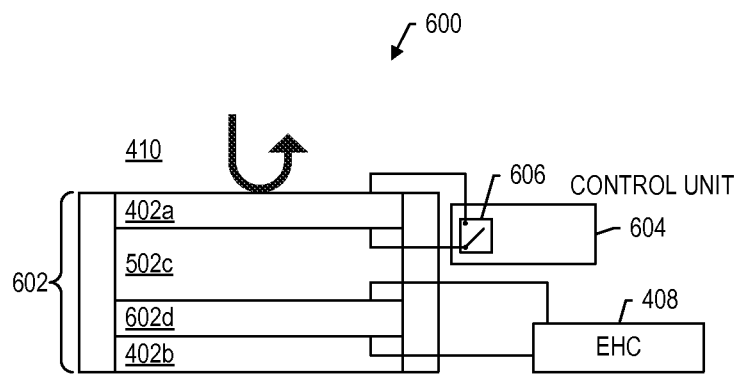
Figure 6B:
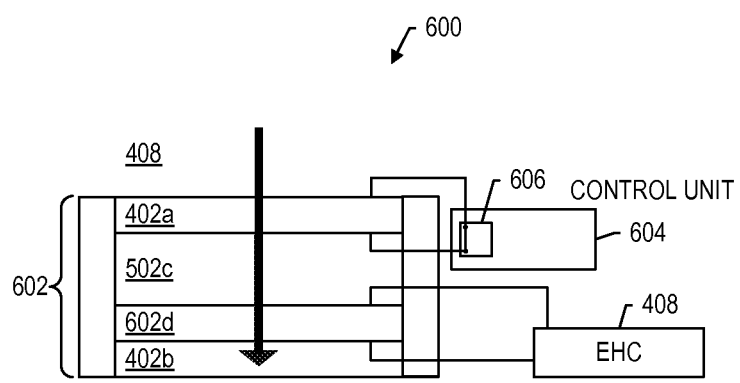

FIGS. 6A and 6B (collectively FIG. 6) illustrate an arrangement 600 including an interface structure 602, control unit 604, switch 606 and EHC 408, which in some examples may correspond to respective ones of the interface structure 210, control unit 214, switch 216 and EHC 224 of FIG. 2. As shown, this arrangement 600 may be similar to the arrangement 500 of FIG. 5, but in which piezoelectric layer 402a may be a first piezoelectric layer, and the interface structure 602 may further include a second piezoelectric layer 602d, such as between the intermediate layer(s) 502c and acoustic absorber layer 402b. This arrangement 600 may also differ from the former arrangement 500 in that the control unit 604 (e.g., control unit 214) may include a SPST switch 606 (e.g., switch 216) electrically connected to opposing surfaces of the piezoelectric layer 402a, but not the EHC 408. In instances in which the intermediate layer(s) include a high-acoustical-impedance layer, in particular, this arrangement 600 may benefit from a multiple intermediate layers, such as a dual layer of the high-acoustical-impedance layer and fluid layer, or perhaps even a further high-acoustical-impedance layer between the second piezoelectric layer and acoustic absorber layer.

In the arrangement 600 of FIG. 6, the switch 606 may be controllable between a first position (FIG. 6A) and a second position (FIG. 6B) to switchably, electrically disconnect or connect the surfaces of the first piezoelectric layer 402a in respective open-circuit and short-circuit conditions. In either condition, however, the surfaces of the second piezoelectric layer 602d may be electrically connected to the EHC 408. The EHC therefore need not have a particular electrical impedance to achieve the open-circuit and short-circuit conditions, and may therefore be easier to optimize than in the former arrangement 500.

The arrangement 600 of FIG. 6 may define three or more primary reflective interfaces. These interfaces may include one between the water 410 in which an incident acoustic wave propagates, and one of the surfaces of the first piezoelectric layer 402a, a second between the first piezoelectric layer and the intermediate layer 502c, and a third between the intermediate layer and second piezoelectric layer 602d. Again, the interface between the second piezoelectric layer and acoustic absorber layer 402b may be primarily absorptive, although as explained above, the interface structure 602 need not include an acoustic absorber layer).

In some examples, the arrangement 600 of FIG. 6 may behave similar to the arrangement 500 of FIG. 5. That is, in a first position (FIG. 6A) of the switch 606, the surfaces of the first piezoelectric layer 402a may be in an open-circuit condition, which may cause a greater amount of the incident acoustic wave to reflect. In a second position (FIG. 6B) of the switch, the short-circuit condition between the surfaces of the first piezoelectric layer may cause a greater amount of the incident acoustic wave to transmit through the first piezoelectric layer. In this position, the second piezoelectric layer may be configured to receive a transmitted acoustic wave corresponding to the incident acoustic wave produced by transmission of the incident acoustic wave through the first piezoelectric layer. And the EHC 408 may capture and store energy produced by the second piezoelectric layer, from which again, at least a portion of the terminal node 102, 204 may be powerable.

Figure 7:
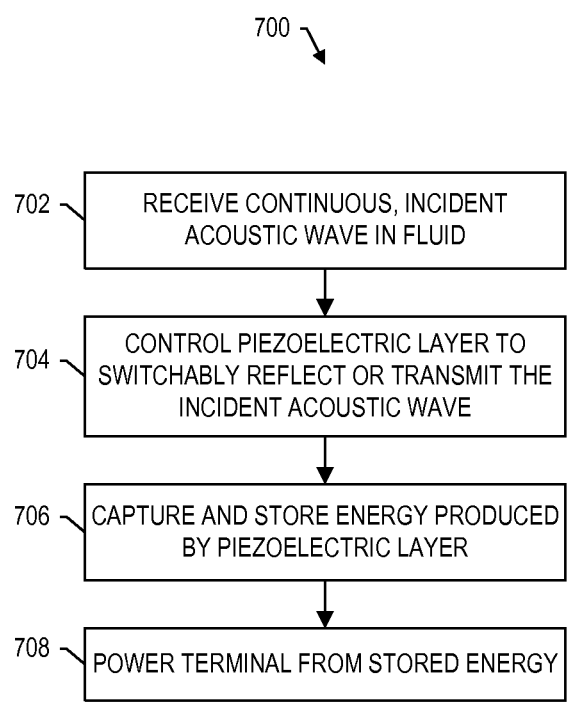
FIG. 7 illustrates a flowchart illustrating various steps in a method according to example implementations of the present disclosure.

Reference is now made to FIG. 7, which illustrates a flowchart illustrating various steps in a method 700 according to example implementations. As shown in block 702, the method may include receiving a continuous, incident acoustic wave propagating through a fluid such as water. Here, the incident acoustic wave may be received by a terminal node 204 including a piezoelectric layer 212. The method may also include controlling the piezoelectric layer to switchably reflect or transmit the incident acoustic wave to produce and modulate an echo thereof with a data stream to thereby convey the data stream within the echo, as shown in block 704. In this regard, the terminal node may also include a switch 216 electrically connected to opposing surfaces of the piezoelectric layer, and controlling the piezoelectric layer may include controlling the switch to switchably, electrically disconnect or connect the surfaces.

As shown in blocks 706, 708, the method may further include capturing and storing energy produced by the piezoelectric layer (or a second piezoelectric layer) while the piezoelectric layer is controlled to transmit the incident acoustic wave, and powering at least a portion of the terminal node from the stored energy.

Returning to FIG. 1, the system 100 of example implementations may be beneficial for use in a number of different scenarios. In one example of a suitable scenario, a plurality of sensors (terminal nodes 102) may be deployed on an ocean floor (body of water 104) to form strategic sensing lines, perimeters, rings or the like. These sensors may record data (sensed input) in its environment, such as the sound of passing underwater vehicles. A watercraft (gateway node 106) may periodically pass over the sensors, transmitting a continuous acoustic wave to the ocean floor and thus the sensors. The acoustic wave may be incident on the sensors, which may control their piezoelectric layers to produce and modulate the wave's echo with a data stream carrying the recorded data, which may be detected back at the watercraft. At the same time, the sensors may capture and store energy produced by their piezoelectric layers, such as in rechargeable batteries from which the sensors may be at least partially powered.

In some examples, sensors (terminal nodes 102) that acquire data may communicate a notice to other sensors, such as by broadcasting unique identifiers of the respective sensors to neighboring sensors. The sensors that receive the notice may repeat the broadcast to their neighboring sensors, and so forth, and may communicate the notice up to the watercraft (gateway node 106) along with any of their own recorded data. In this manner, the watercraft may be notified of particular sensors that have acquired data and may pass directly to those sensors, or pass over those sensors more frequently.

In some examples, the gateway node 106 may be configured to communicate with one or more of the terminal nodes 102. For example, the gateway node may in various instances produce an acoustic wave modulated with a data stream to thereby convey the data stream to a terminal node, instead of producing the continuous acoustic wave. The terminal node may control its piezoelectric layer 212 to transmit the incident, modulated acoustic wave, which may be thereby detected (e.g., energy harvested versus time may provide the data stream). Similarly, in some examples, the terminal node may control its piezoelectric layer to more generally function as an acoustic sensor to measure acoustic waves in its environment, such as those from passing underwater vehicles as indicated above. Or the terminal node may include another sensor (e.g., transducer 222) configured to detect the modulated acoustic wave. The terminal node (e.g., processor 218) may then appropriately demodulate the modulated acoustic wave to extract the data stream from the gateway node.

Many modifications and other implementations of the disclosure set forth herein will come to mind to one skilled in the art to which these disclosure pertain having the benefit of the teachings presented in the foregoing descriptions and the associated drawings. Therefore, it is to be understood that the disclosure are not to be limited to the specific implementations disclosed and that modifications and other implementations are intended to be included within the scope of the appended claims. Moreover, although the foregoing descriptions and the associated drawings describe example implementations in the context of certain example combinations of elements and/or functions, it should be appreciated that different combinations of elements and/or functions may be provided by alternative implementations without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system comprising:
a gateway node including an actuator configured to produce a continuous acoustic wave for propagation through a fluid, and a sensor configured to detect an echo thereof; and
a terminal node configured to control a piezoelectric layer to switchably reflect or transmit a greater amount of an incident portion of the continuous acoustic wave to produce and modulate the echo with a data stream to thereby convey the data stream within the echo, the sensor being configured to detect the echo modulated by the terminal node,
wherein the piezoelectric layer is a first piezoelectric layer, and the terminal node further includes a second piezoelectric layer configured to receive a transmitted acoustic wave corresponding to the greater amount of the incident portion of the continuous acoustic wave produced by transmission thereof through the first piezoelectric layer.

2. The system of claim 1, wherein the terminal node is further configured to capture and store energy produced by the piezoelectric layer while the piezoelectric layer is controlled to transmit the greater amount of the incident portion of the continuous acoustic wave, and
wherein at least a portion of the terminal node is powerable from the stored energy.

3. The system of claim 1, wherein the terminal node further includes an acoustic absorber layer configured to receive a transmitted acoustic wave corresponding to the greater amount of the incident portion of the continuous acoustic wave produced by transmission thereof through the piezoelectric layer.

4. The system of claim 3, wherein the terminal node further includes an intermediate layer between the piezoelectric layer and the acoustic absorber layer, the terminal node defining a first primary reflective interface between the fluid and piezoelectric layer, and a second primary reflective interface between the piezoelectric layer and the intermediate layer.

5. The system of claim 1, wherein the terminal node is further configured to capture and store energy produced by the second piezoelectric layer while the first piezoelectric layer is controlled to transmit the greater amount of the incident portion of the continuous acoustic wave, and
wherein at least a portion of the terminal node is powerable from the stored energy.

6. The system of claim 1, wherein the terminal node further includes a sensor configured to measure a physical property of an environment of the terminal node, and provide a sensed input characteristic thereof, the data stream with which the echo is modulated being configured to carry the sensed input.

7. An apparatus comprising:
an interface structure including a piezoelectric layer controllable to switchably reflect or transmit a greater amount of an incident portion of a continuous acoustic wave propagating through a fluid; and
a control unit configured to control the piezoelectric layer to switchably reflect or transmit the greater amount of the incident portion of the continuous acoustic wave to produce and modulate an echo thereof with a data stream to thereby convey the data stream within the echo, the control unit comprising:
a switch electrically connected to opposing surfaces of the piezoelectric layer, and controllable to switchably, electrically disconnect or connect the surfaces; and
a processor configured to control the switch to thereby control the piezoelectric layer to switchably reflect or transmit the greater amount of the incident portion of the continuous acoustic wave,
wherein the piezoelectric layer is a first piezoelectric layer, and the interface structure further includes a second piezoelectric layer configured to receive a transmitted acoustic wave corresponding to the greater amount of the incident portion of the continuous acoustic wave produced by transmission thereof through the first piezoelectric layer.

8. The apparatus of claim 7 further comprising:
an energy-harvesting circuit configured to capture and store energy produced by the piezoelectric layer while the piezoelectric layer is controlled to transmit the greater amount of the incident portion of the continuous acoustic wave,
wherein at least a portion of the control unit is powerable from the stored energy.

9. The apparatus of claim 7, wherein the interface structure further includes an acoustic absorber layer configured to receive a transmitted acoustic wave corresponding to the greater amount of the incident portion of the continuous acoustic wave produced by transmission thereof through the piezoelectric layer.

10. The apparatus of claim 9, wherein the interface structure further includes an intermediate layer between the piezoelectric layer and the acoustic absorber layer, the interface structure defining a first primary reflective interface between the fluid and piezoelectric layer, and a second primary reflective interface between the piezoelectric layer and the intermediate layer.

11. The apparatus of claim 7 further comprising:
an energy-harvesting circuit configured to capture and store energy produced by the second piezoelectric layer while the first piezoelectric layer is controlled to transmit the greater amount of the incident portion of the continuous acoustic wave,
wherein at least a portion of the control unit is powerable from the stored energy.

12. The apparatus of claim 7, wherein the control unit further includes a sensor configured to measure a physical property of an environment of the apparatus, and provide a sensed input characteristic thereof, the data stream with which the echo is modulated being configured to carry the sensed input.

13. A method comprising:
receiving an incident portion of a continuous acoustic wave propagating through a fluid, the incident portion of the continuous acoustic wave being received by a terminal node including a piezoelectric layer; and
controlling the piezoelectric layer to switchably reflect or transmit a greater amount of the incident portion of the continuous acoustic wave to produce and modulate an echo thereof with a data stream to thereby convey the data stream within the echo, wherein the terminal node also includes a switch electrically connected to opposing surfaces of the piezoelectric layer, and controlling the piezoelectric layer includes controlling the switch to switchably, electrically disconnect or connect the surfaces,
wherein the piezoelectric layer is a first piezoelectric layer, and the terminal node further includes a second piezoelectric layer, and
wherein the method further comprises the second piezoelectric layer receiving a transmitted acoustic wave corresponding to the greater amount of the incident portion of the continuous acoustic wave produced by transmission thereof through the first piezoelectric layer.

14. The method of claim 13 further comprising:
capturing and storing energy produced by the piezoelectric layer while the piezoelectric layer is controlled to transmit the greater amount of the incident portion of the continuous acoustic wave; and
powering at least a portion of the terminal node from the stored energy.

15. The method of claim 13, wherein the terminal node further includes an acoustic absorber layer, and
wherein the method further comprises the acoustic absorber layer receiving a transmitted acoustic wave corresponding to the greater amount of the incident portion of the continuous acoustic wave produced by transmission thereof through the piezoelectric layer.

16. The method of claim 15, wherein the terminal node further includes an intermediate layer between the piezoelectric layer and the acoustic absorber layer, the terminal node defining a first primary reflective interface between the fluid and piezoelectric layer, and a second primary reflective interface between the piezoelectric layer and the intermediate layer.

17. The method of claim 13 further comprising:
capturing and storing energy produced by the second piezoelectric layer while the first piezoelectric layer is controlled to transmit the greater amount of the incident portion of the continuous acoustic wave; and
powering at least a portion of the terminal node from the stored energy.

18. The method of claim 13 further comprising:
measuring by a sensor, a physical property of an environment of the terminal node, and providing a sensed input characteristic thereof, the data stream with which the echo is modulated carrying the sensed input.

\* \* \* \* \*